United States Patent
Neves (10) Patent No.: US 10,699,452 B2
(45) Date of Patent: *Jun. 30, 2020

(54) METHODS AND SYSTEMS FOR PROVIDING A VISUAL FEEDBACK REPRESENTATION OF PERFORMANCE METRICS

(71) Applicant: salesforce.com, inc., San Francisco, CA (US)

(72) Inventor: Joao Neves, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,000

(22) Filed: May 13, 2019

(65) Prior Publication Data

US 2019/0266767 A1    Aug. 29, 2019

Related U.S. Application Data

(63) Continuation of application No. 15/459,302, filed on Mar. 15, 2017, now Pat. No. 10,332,289.

(51) Int. Cl.
*G06T 11/20* (2006.01)
*G06T 11/60* (2006.01)

(52) U.S. Cl.
CPC ............ *G06T 11/206* (2013.01); *G06T 11/60* (2013.01); *G06T 2200/24* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

*Primary Examiner* — Ryan M Gray (74) *Attorney, Agent, or Firm* — LKGlobal | Lorenz & Kopf, LLP (57) ABSTRACT

A method for presenting a visual implementation of data by a computing device comprising at least one processor and a system memory element is provided. The method executes a software application, by the at least one processor of the computing device; detects an operation performed by the software application during execution; monitors performance of the software application, by: identifying successful execution of the operation; and identifying timing data indicating a length of time for completion of the operation during execution of the software application; and presents visual feedback of the performance during execution of the software application, via a display element of the computing device, wherein the visual feedback comprises a first set of graphical elements indicating the successful execution and the timing data, and wherein the first set of graphical elements is presented onscreen with a concurrent presentation of the software application.

20 Claims, 9 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven, et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins et al. |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0138775 A1 | 6/2010 | Kohen et al. |
| 2011/0099550 A1 | 4/2011 | Shafi |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0249917 A1* | 9/2013 | Fanning ............... G06T 11/206 345/440 |
| 2013/0290934 A1* | 10/2013 | Simon ............... G06F 11/3636 717/125 |
| 2014/0035922 A1 | 2/2014 | Watt et al. |
| 2017/0046254 A1 | 2/2017 | Buege |
| 2018/0124453 A1* | 5/2018 | Zweig ............... H04N 21/8456 |
| 2018/0293154 A1* | 10/2018 | Giat ............... G06F 11/3466 |

* cited by examiner

FIG. 9

METHODS AND SYSTEMS FOR PROVIDING A VISUAL FEEDBACK REPRESENTATION OF PERFORMANCE METRICS

CROSS-REFERENCE TO RELATED APPLICATION

This application is a continuation of U.S. patent application Ser. No. 15/459,302, filed Mar. 15, 2017 and issued on Jun. 25, 2019 as U.S. Pat. No. 10,332,289.

TECHNICAL FIELD

Embodiments of the subject matter described herein relate generally to providing visual feedback for operations of a software application. More particularly, embodiments of the subject matter relate to monitoring performance of a software application and presenting graphical elements associated with performance metrics of the software application.

BACKGROUND

Generally, software developers execute a software application and, after completion of particular operations or tasks, are able to retrieve performance data for analysis. Such performance data is available after the fact, and interpretation may be complicated. This process of testing the software application may require significant time to cycle between execution of the application and analysis of the performance data.

Accordingly, it is desirable to provide performance analytics data in different ways and at different times in the software production cycle. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for presenting a visual implementation of data by a computing device comprising at least one processor and a system memory element. The method executes a software application, by the at least one processor of the computing device; detects an operation performed by the software application during execution, by the at least one processor; monitors performance of the software application, by the at least one processor, by: identifying successful execution of the operation; and identifying timing data indicating a length of time for completion of the operation during execution of the software application; and presents visual feedback of the performance during execution of the software application, via a display element of the computing device, wherein the visual feedback comprises a first set of graphical elements indicating the successful execution and the timing data, and wherein the first set of graphical elements is presented onscreen with a concurrent presentation of the software application.

Some embodiments of the present disclosure provide a computing device. The computing device includes a system memory element; a display element, configured to present graphical elements associated with performance of the computing device; and at least one processor communicatively coupled to the system memory element and the display element, the at least one processor configured to: execute a software application; detect an operation performed by the software application during execution, by the at least one processor; monitor performance of the software application, by: identifying successful execution of the operation; and identifying timing data indicating a length of time for completion of the operation during execution of the software application; and present visual feedback of the performance, via the display element of the computing device, the visual feedback comprising a first set of graphical elements indicating successful execution and the timing data, and the first set of graphical elements presented onscreen with a concurrent presentation of the software application.

Some embodiments of the present disclosure provide a non-transitory, computer-readable medium containing instructions thereon, which, when executed by a processor, are capable of performing a method. The method executes a software application, by the processor; monitors performance of the software application, by the processor, the performance comprising at least execution data and timing data associated with the software application, by: detecting an operation performed by the software application during execution, by the processor; identifying successful execution of the operation; and identifying timing data indicating a length of time for completion of the operation during execution of the software application; and presents visual feedback of the performance, via a display element of the computing device, the visual feedback comprising a first set of graphical elements indicating successful execution and the timing data, and the first set of graphical elements presented onscreen with a concurrent presentation of the software application.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods and computing devices for providing visual feedback data associated with software application performance, including animated graphical elements that indicate successful execution of software application operations and animated graphical elements that indicate a length of time required for completion of software application operations. Such visual feedback data is particularly useful to software application developers, and is presented concurrently, as a superimposed, graphical element overlay, with a presentation of the software application being tested.

Certain terminologies are used with regard to the various embodiments of the present disclosure. Performance metrics are data associated with whether particular software application operations executed successfully, the time it takes for an operation to complete, and other data associated with software application operation performance. Graphical elements associated with performance metrics may be presented as an overlay that is superimposed over a user interface of the executed software application or a timeline, for additional timing detail.

Figure 1:
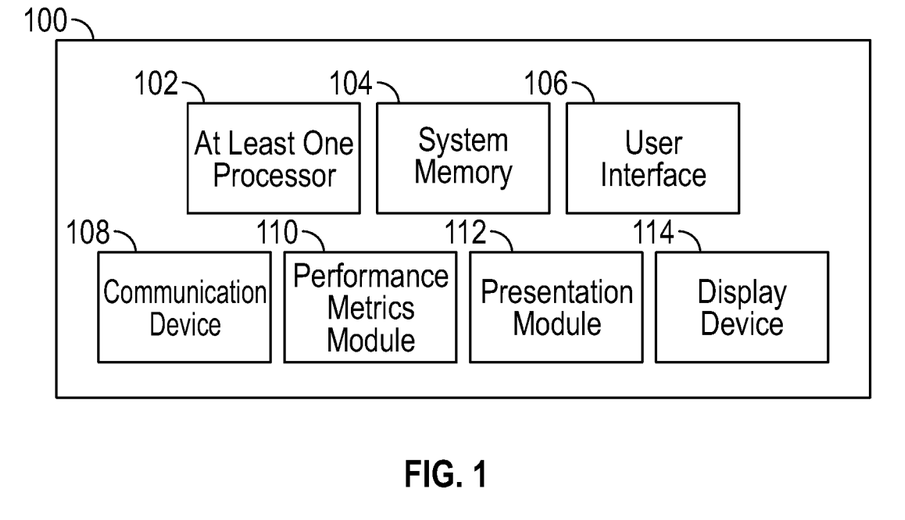
FIG. 1 is a functional block diagram of a visual feedback system associated with performance metrics of a software application, in accordance with the disclosed embodiments.

Turning now to the figures, FIG. 1 is a functional block diagram of a visual feedback system 100 associated with performance metrics of a software application, in accordance with the disclosed embodiments. The visual feedback system 100 generally operates to execute a software application, monitor performance of the executed software application, and provide visual feedback indicators of the performance of the executed software application. In practice, an embodiment of the visual feedback system 100 may include additional or alternative elements and components, as desired for the particular application. For example, additional components such as displays and user input components may be employed without departing from the scope of the present disclosure.

The visual feedback system 100 may include, without limitation: at least one processor 102; system memory 104; a user interface 106; a communication device 108; a performance metrics module 110; a presentation module 112; and a display device 114. These elements and features of the visual feedback system 100 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 1. Moreover, it should be appreciated that embodiments of the visual feedback system 100 will include other elements, modules, and features that cooperate to support the desired functionality. For simplicity, FIG. 1 only depicts certain elements that relate to the visual feedback techniques described in more detail below.

The at least one processor 102 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 102 may be realized as one or more microprocessors, controllers, microcontrollers, or state machines. Moreover, the at least one processor 102 may be implemented as a combination of computing devices, e.g., a combination of digital signal processors and microprocessors, a plurality of microprocessors, one or more microprocessors in conjunction with a digital signal processor core, or any other such configuration.

The at least one processor 102 is communicatively coupled to the system memory 104. The system memory 104 is configured to store and maintain software applications, performance metrics associated with operations of one or more software applications, and graphical elements associated with such performance metrics. The system memory 104 may be realized using any number of devices, components, or modules, as appropriate to the embodiment. Moreover, the visual feedback system 100 could include system memory 104 integrated therein and/or a system memory 104 operatively coupled thereto, as appropriate to the particular embodiment. In practice, the system memory 104 could be realized as RAM memory, flash memory, EPROM memory, EEPROM memory, registers, a hard disk, a removable disk, or any other form of storage medium known in the art. In certain embodiments, the system memory 104 includes a hard disk, which may also be used to support functions of the visual feedback system 100. The system memory 104 can be coupled to the at least one processor 102 such that the at least one processor 102 can read information from, and write information to, the system memory 104. In the alternative, the system memory 104 may be integral to the at least one processor 102. As an example, the at least one processor 102 and the system memory 104 may reside in a suitably designed application-specific integrated circuit (ASIC).

The user interface 106 may include or cooperate with various features to allow a user to interact with the visual feedback system 100. Accordingly, the user interface 106 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the visual feedback system 100. For example, the user interface 106 could be manipulated by an operator to provide user input selections of particular software application operations for analysis, user selections of particular graphical elements for additional data and details display, and/or to minimize or reset a display of graphical elements, as described herein.

In certain embodiments, the user interface 106 may include or cooperate with various features to allow a user to interact with the visual feedback system 100 via graphical elements rendered on a display element (e.g., the display device 114). Accordingly, the user interface 106 may initiate the creation, maintenance, and presentation of a graphical user interface (GUI). In certain embodiments, the display device 114 implements touch-sensitive technology for purposes of interacting with the GUI. Thus, a user can manipulate the GUI by moving a cursor symbol rendered on the display device 114, or by physically interacting with the display device 114 itself for recognition and interpretation, via the user interface 106.

The communication device 108 is suitably configured to communicate data between the visual feedback system 100 and one or more remote servers via a network call. The communication device 108 may transmit and receive communications over a wireless local area network (WLAN), the Internet, a satellite uplink/downlink, a cellular network, a broadband network, a wide area network, or the like. As described in more detail below, data received by the communication device 108 may include, without limitation, responses to a network call and other data compatible with the visual feedback system 100. Data provided by the communication device 108 may include, without limitation, network calls and the like.

The performance metrics module 110 is suitably configured to monitor performance of the software application or, more specifically, to monitor the performance of tasks or operations performed by the software application. The performance metrics module 110 obtains data associated with whether particular software application operations executed successfully, the time it takes for an operation to complete, and other data associated with software application operation performance.

The presentation module 112 is configured to obtain performance metrics data associated with performance of the software application via the performance metrics module 110, as described previously, and to present graphical elements representing the performance metrics via the display device 114. The presentation module 112 is further configured to present graphical elements in varying ways, based on a portrait orientation or a landscape orientation of the display device 114. For example, in certain embodiments the visual feedback system 100 may be implemented by a handheld computing device (e.g., a tablet computer, smartphone, or personal digital assistant (PDA)). Here, when the computing device is positioned in portrait orientation, the presentation module 112 presents graphical elements as an overlay that is superimposed over a user interface (UI) of the software application that is concurrently executed and presented. When the computing device is positioned in landscape orientation, however, the presentation module 112 may replace the UI of the software application by a timeline graphic, wherein the graphical elements are presented as an overlay that is superimposed over the timeline graphic. In some embodiments, the presentation module 112 may present animated graphical elements as part of a real-time, performance metrics display. In some embodiments, the presentation module 112 may present graphical elements associated with performance metrics concurrently with a presentation of the software application.

In practice, the performance metrics module 110 and/or the presentation module 112 may be implemented with (or cooperate with) the at least one processor 102 to perform at least some of the functions and operations described in more detail herein. In this regard, the performance metrics module 110 and/or the presentation module 112 may be realized as suitably written processing logic, application program code, or the like.

The display device 114 is configured to display various icons, text, and/or graphical elements associated with performance metrics of an executed software application, as described with regard to the presentation module 112. In an exemplary embodiment, the display device 114 is communicatively coupled to the user interface 106 and the at least one processor 102. The at least one processor 102, the user interface 106, and the display device 114 are cooperatively configured to display, render, or otherwise convey one or more graphical representations or images associated with performance metrics on the display device 114, as described in greater detail below. In an exemplary embodiment, the display device 114 is realized as an electronic display configured to graphically display performance metrics data, as described herein. In some embodiments, the visual feedback system 100 is an integrated computer system for which the display device is communicatively coupled in some way. In other embodiments, the display device 114 is implemented as a display screen of a standalone, personal computing device (e.g., laptop computer, tablet computer). It will be appreciated that although the display device 114 may be implemented using a single display, certain embodiments may use additional displays (i.e., a plurality of displays) to accomplish the functionality of the display device 114 described herein.

FIGS. 2A-6B illustrate embodiments of functionality associated with visual feedback (e.g., graphical elements associated with performance metrics for a software application) presented via a display of a computing device. Such graphical elements may be presented concurrently with a presentation of the software application or as a graphical element display on a timeline. In practice, each of the embodiments shown by FIGS. 2A-7B may include other features (not pictured) in combination with the features illustrated, without departing from the present disclosure.

Figure 2A:
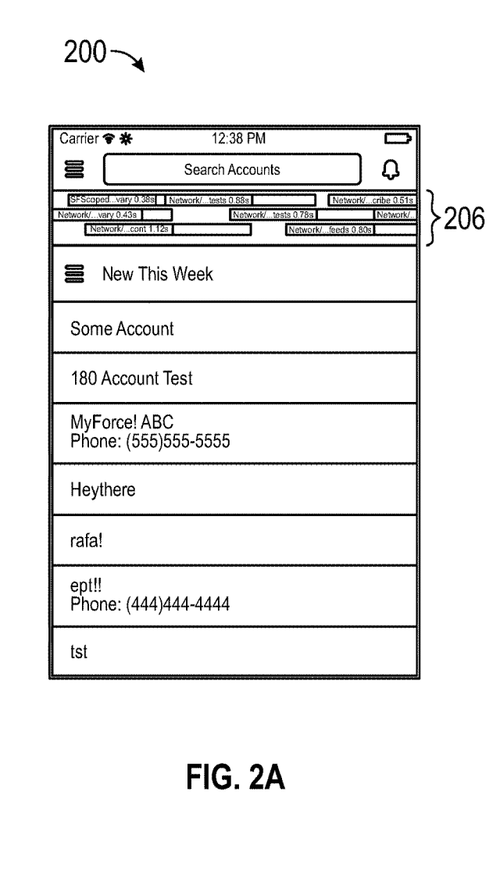
FIGS. 2A-2C are diagrams of graphical elements superimposed over a user interface, in accordance with the disclosed embodiments.
Figure 2B:
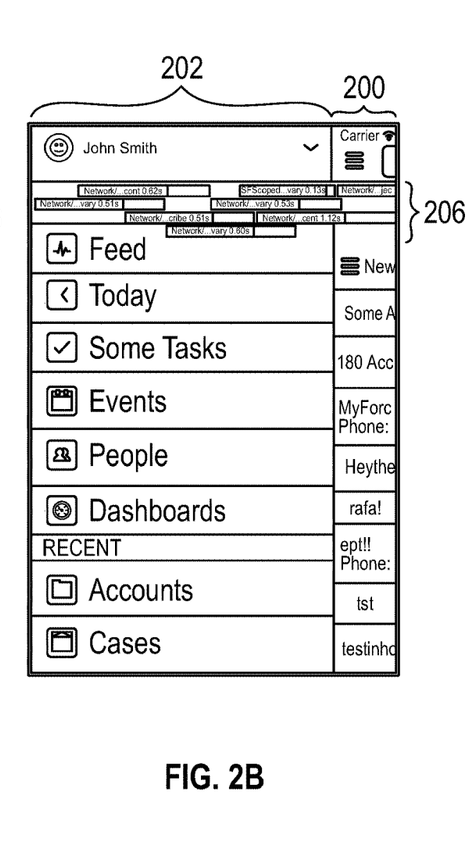
Figure 2C:
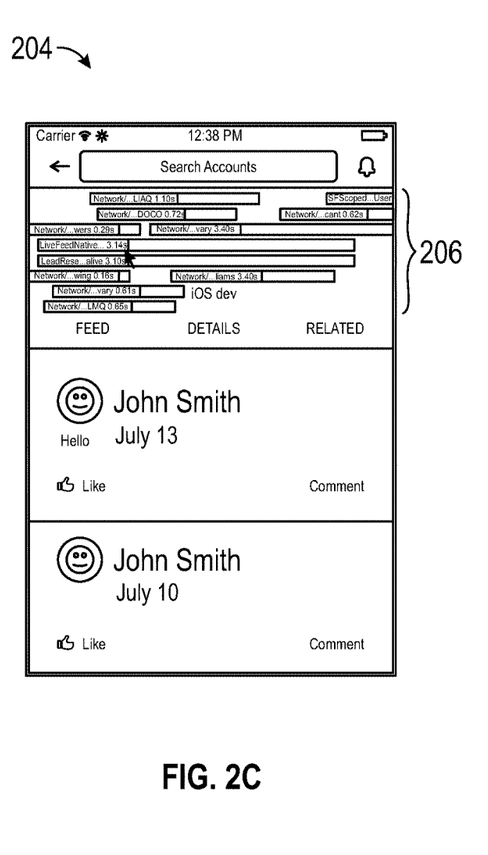

FIGS. 2A-2C are diagrams of graphical elements 206 superimposed over a plurality of graphical user interfaces 200, 202, 204, in accordance with the disclosed embodiments. It should be appreciated that FIGS. 2A-2C depict exemplary embodiments of the visual feedback system (see FIG. 1, reference 100), and that some implementations of the visual feedback system may include additional elements or components. Further, the visual feedback system may be used to provide visual performance metrics data for any type of software application, and need not be limited by embodiments of software application features described herein.

FIG. 2A illustrates a graphical user interface 200 of an executed software application, with graphical elements 206 associated with performance metrics for the software application superimposed over the graphical user interface 200. Here, the graphical user interface 200 is an unchanged, standard interface that is presented by the software application, when the software application is executed and regardless of any testing or performance metrics analysis. As shown, the graphical elements 206 are bar-shaped elements positioned to overlay the graphical user interface 200 at the top of the display screen. FIG. 2B shows a user navigation of the graphical user interface 200 to move the graphical user interface 200 over to the right side of the display screen, so that a second graphical user interface 202 is shown. The graphical elements 206 continue to overlay the presented graphical user interface 200 and second graphical user interface 202, in the same position at the top of the display screen, irrespective of the navigation between the graphical user interface 200 and the second graphical user interface 202. FIG. 2C shows another user navigation, wherein a selection was made from the second graphical user interface 202, to render a third graphical user interface 204 on the display screen. As noted previously, the graphical elements 206 remain positioned to overlay the third graphical user interface 204, in the same location at the top of the display screen. In the exemplary embodiment shown, the graphical elements 206 are displayed continuously, in the same location of the display screen, and in a manner superimposed over any of the graphical user interfaces 200, 202, 204.

Figure 3A:
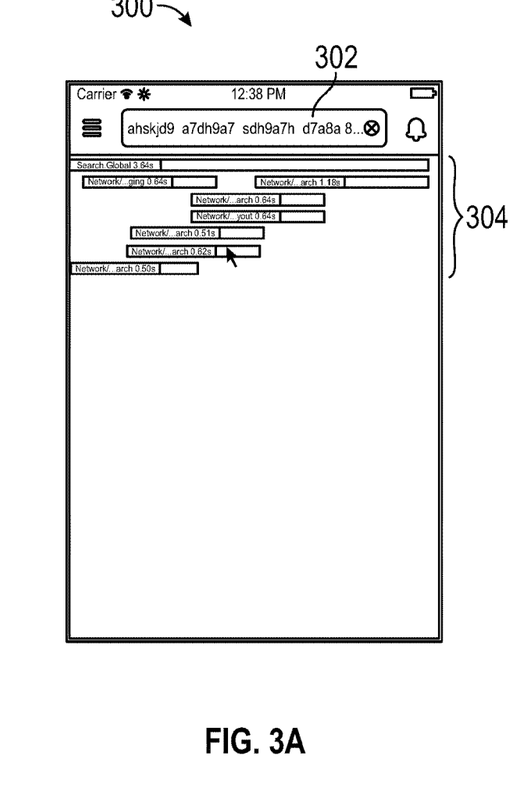
FIGS. 3A-3B is a diagram of graphical elements superimposed over a user interface, in accordance with the disclosed embodiments.
Figure 3B:
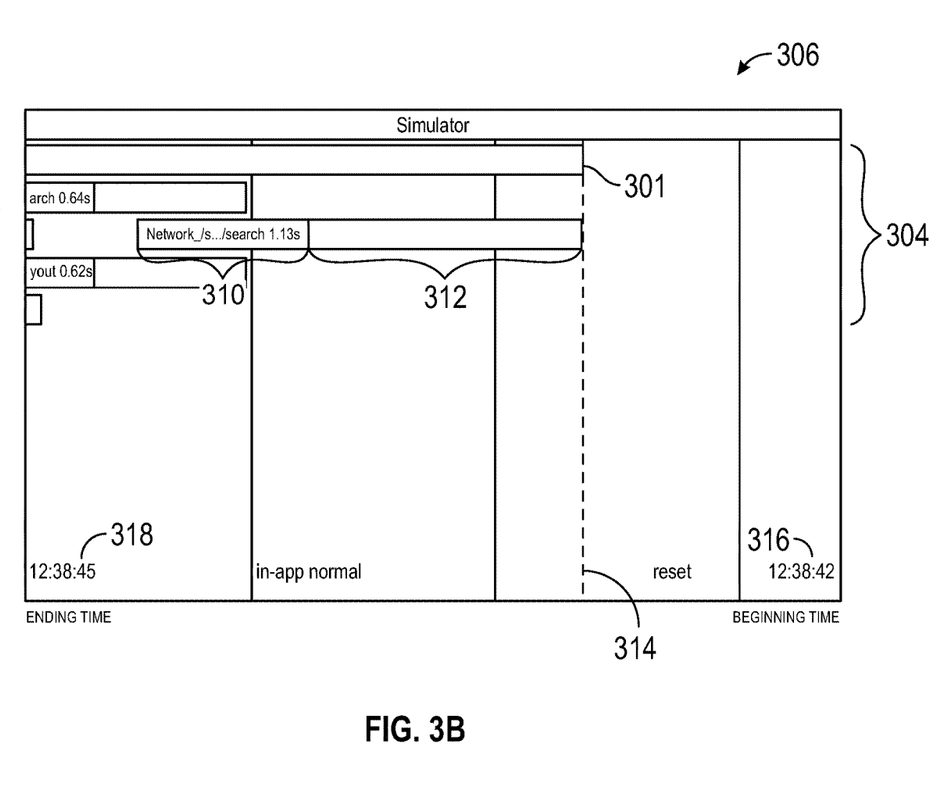

FIGS. 3A-3B are diagrams of graphical elements 304 superimposed over a user interface 300, for purposes of presenting performance metrics related to a search function, in accordance with the disclosed embodiments. In FIG. 3A, a user has entered one or more search terms into the search field 302 to execute a search function, by the software application. Each of the graphical elements 304 represents a different operation that is currently being performed by the software application, and one of the graphical elements 304 represents the executed global search.

When triggered by a change in orientation (e.g., portrait to landscape orientation) or a selection made by a user, the graphical elements 304 are then presented superimposed over a timeline 306, as shown in FIG. 3B. Here, the operation being performed is a global search, as shown in FIG. 3A, and the graphical elements 304 include a subset 301 of graphical elements 304 that are associated with the global search. As shown, the subset 301 of the graphical elements 304 begins at a beginning point 314, which indicates a time at which the global search was executed. Each of the graphical elements 304 includes a bar-shaped element 312 that represents execution of an operation and a length of time for completion of the operation, during execution. Each bar-shaped element 312 is positioned on the timeline 306, and shows a beginning point 314 at which the operation is executed. In certain embodiments, the timeline and the bar-shaped elements 312 are animated and shift across a display screen to correspond with the passage of time. The timeline 306 includes an indication of a start time 316 and an end time 318 for the timeline 306, which provides a clock reference for the beginning point 314 (and an ending point, not shown) of the graphical elements 304. Each bar-shaped element 312 has a length that corresponds to the length of time for completion of the operation. In some embodiments, each bar-shaped element 312 is displayed with a label 310 that includes other data related to the operation represented by the bar-shaped element 312.

Figure 4:
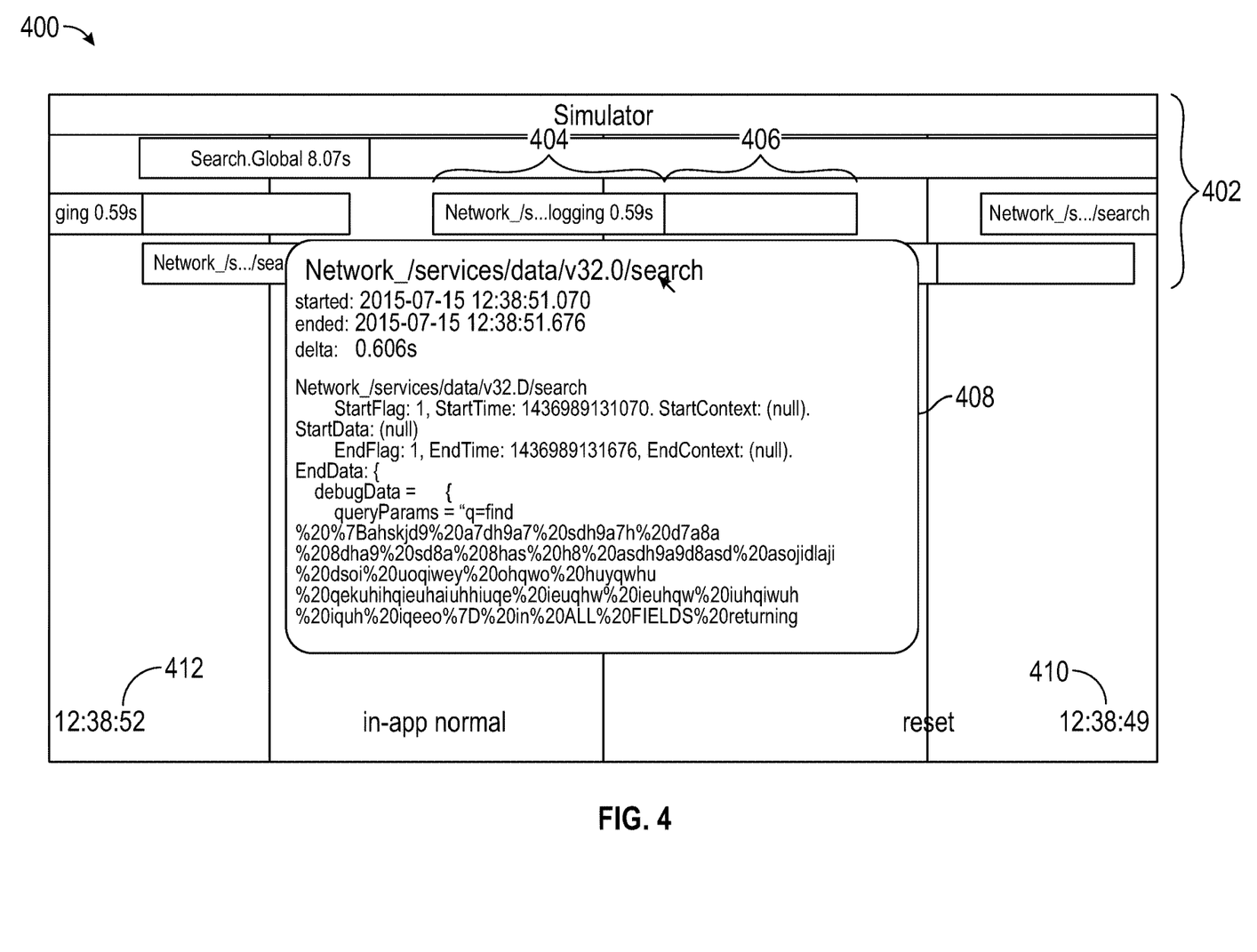
FIG. 4 is a diagram of graphical elements superimposed over a timeline, in accordance with the disclosed embodiments.

FIG. 4 is a diagram of graphical elements 402 superimposed over a timeline 400, in accordance with the disclosed embodiments. As described previously with regard to FIGS. 3A-3B, each of the graphical elements 402 represents a different operation that is currently being performed by the software application, and is positioned on the timeline 400 that depicts a beginning time 410 and an ending time 412 for use as clock references for the beginning and ending points of each of the graphical elements 402. Each of the graphical elements 402 includes a bar-shaped element 406 and a label 404, wherein the bar-shaped element 406 represents a length of time for completion of the operation, and wherein the label 404 includes other data related to the operation represented by the bar-shaped element 406. In the embodiment shown, when a user clicks on, or otherwise selects, the label 404 for a graphical element 402, then additional details 408 related to the operation are displayed. Details shown may include a text representation of timing data, a Uniform Resource Locator (URL) associated with the operation, and identification of data transmitted and/or received during performance of the operation.

Figure 5:
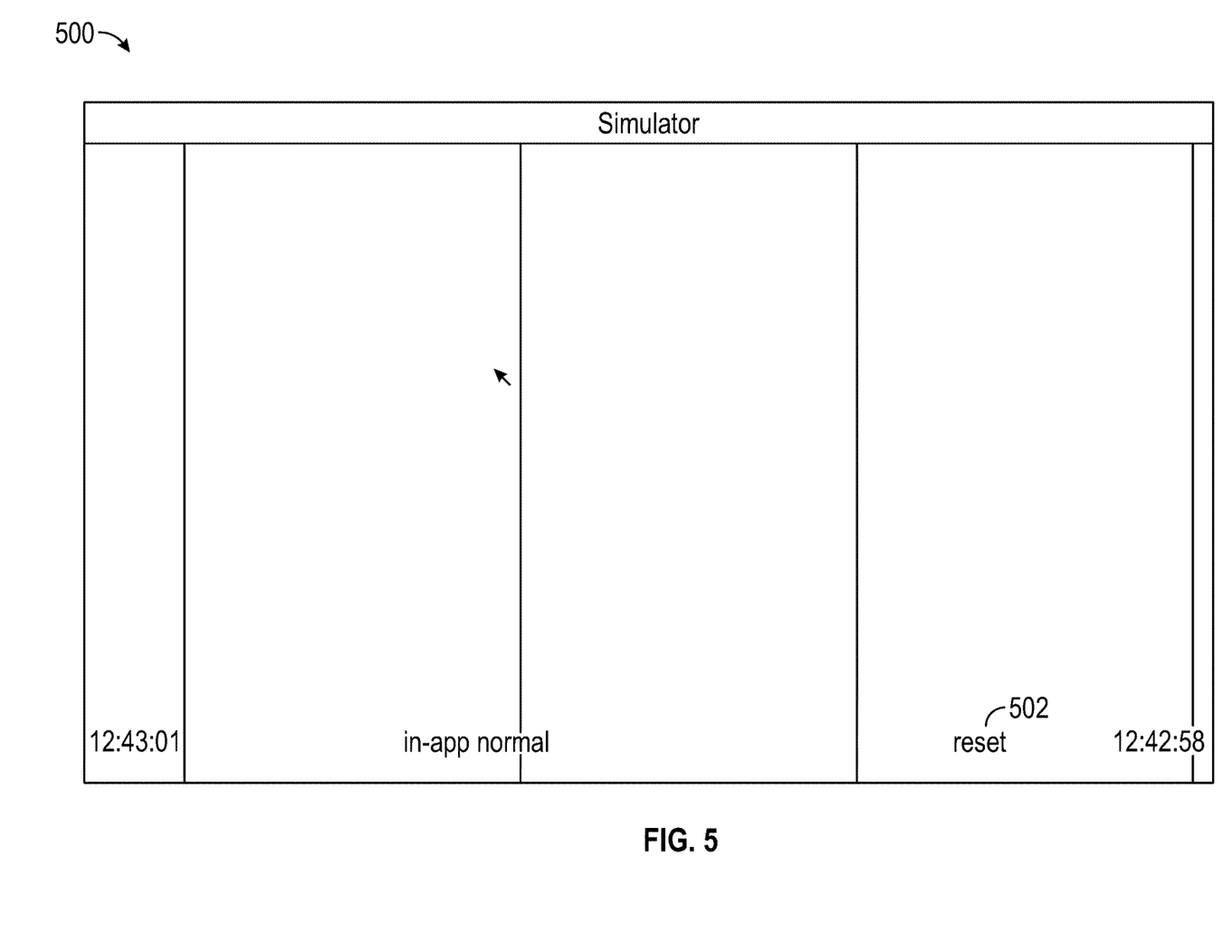
FIG. 5 is a diagram of a timeline graphical element, in accordance with the disclosed embodiments.

FIG. 5 is a diagram of a timeline 500 that has been reset, in accordance with the disclosed embodiments. The timeline 500 includes a user-selectable reset 502 graphical element. When selected by the user, the reset 502 graphical element deletes any graphical elements shown on the timeline 500. Before the reset 502 graphical element is clicked or otherwise selected, the timeline 500 may include any number of graphical elements, wherein each of the graphical elements represents a particular operation executed by the software application. As shown, the timeline 500 is clear, indicating that a user has already selected the reset 502 graphical element.

Figure 6A:
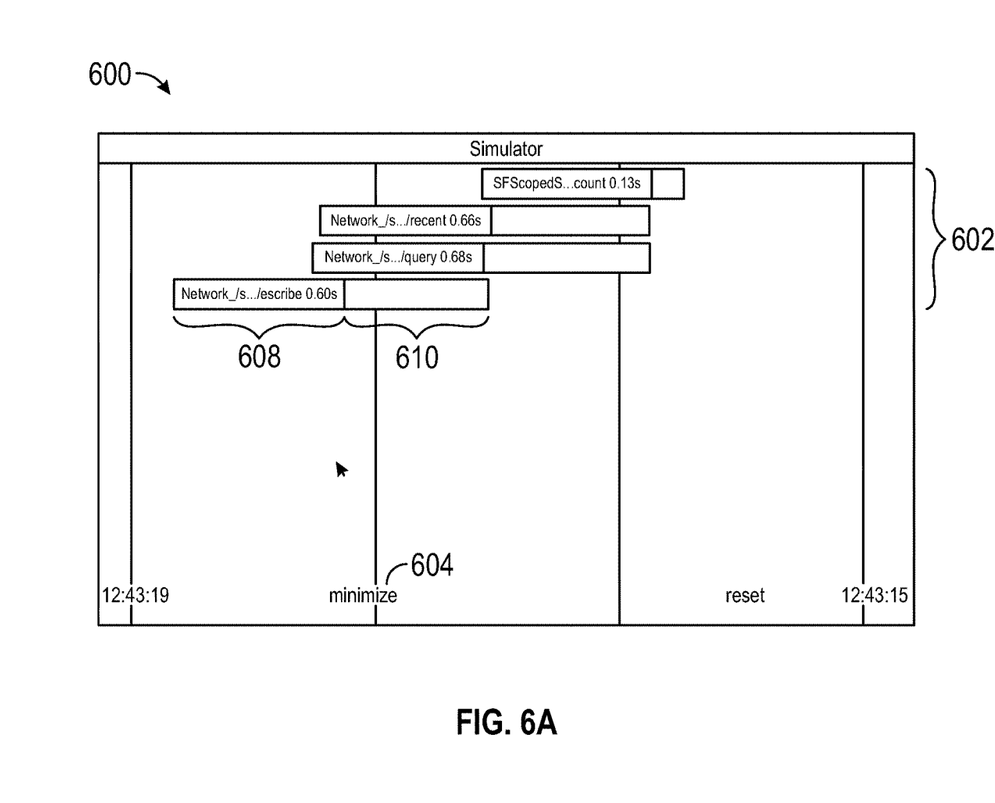
FIGS. 6A-6B are diagrams of graphical elements of varying size superimposed over a user interface, in accordance with the disclosed embodiments.
Figure 6B:
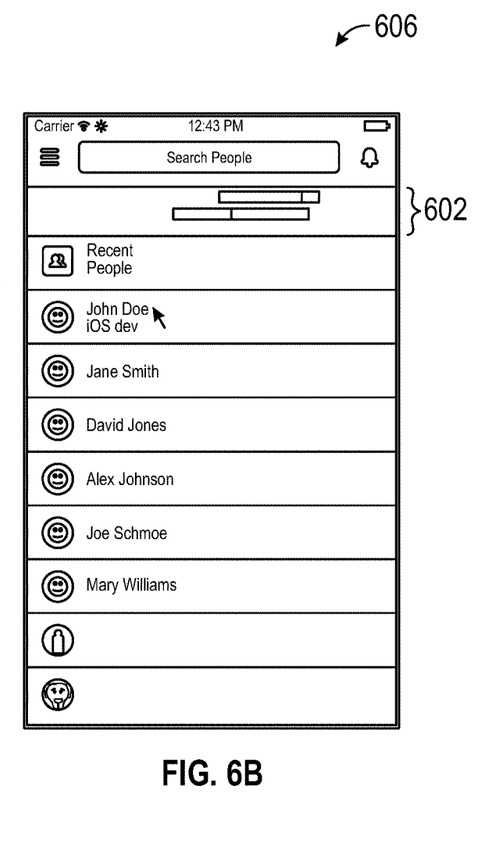

FIGS. 6A-6B are diagrams of graphical elements 602 of varying size superimposed over user interfaces, in accordance with the disclosed embodiments. In FIG. 6A, the graphical elements 602 are positioned on a timeline 600. The timeline 600 also includes a user-selectable minimize 604 graphical element. When selected by the user, the minimize 604 graphical element minimizes the graphical elements 602 by removing the label 608 from each bar-shaped element 610 and reducing the size of each bar-shaped element 610, as shown in FIG. 6B. Before the minimize 604 graphical element is clicked or otherwise selected, the scenario shown in FIG. 6A is applicable. Here, the timeline 600 includes graphical elements 602 that include bar-shaped elements 610 with an associated label 608, wherein each of the graphical elements represents a particular operation executed by the software application. However, after the minimize 604 graphical element is selected, the scenario shown in FIG. 6B is applicable. Here, the graphical elements 602 have been reduced in size and do not include labels.

Figure 7:
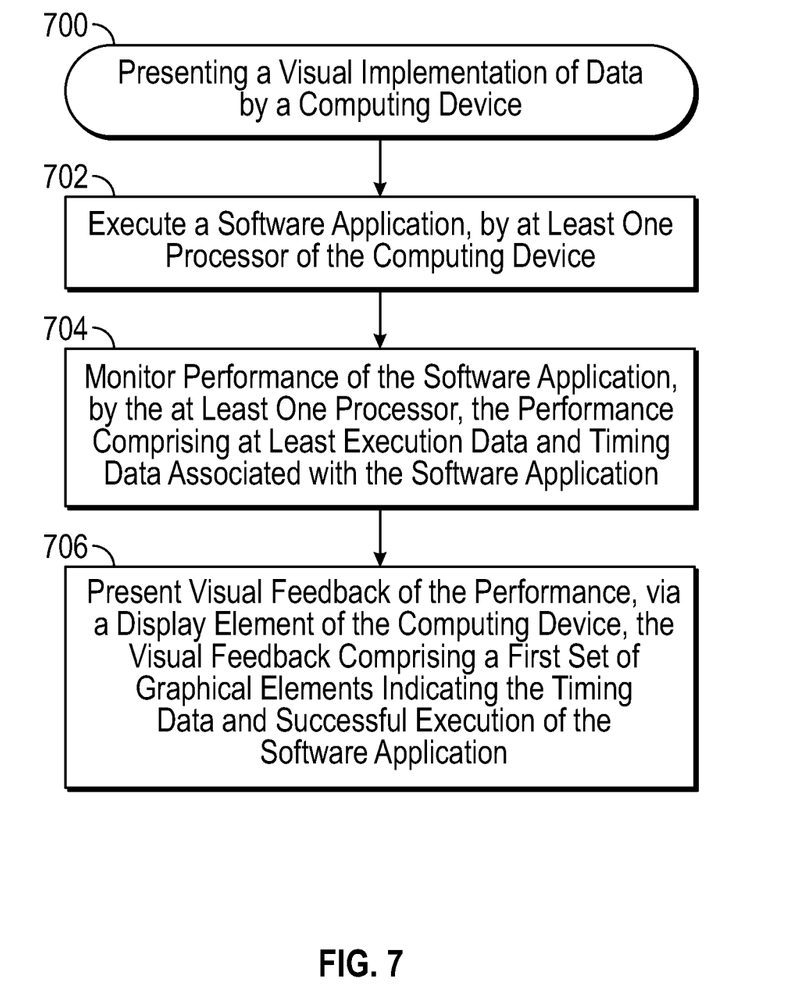
FIG. 7 is a flow chart that illustrates an embodiment of a process for presenting a visual implementation of data by a computing device.

FIG. 7 is a flow chart that illustrates an embodiment of a process 700 for presenting a visual implementation of data by a computing device. First, the process 700 executes a software application, by at least one processor of the computing device (step 702). The software application may be any application executed by the computing device, and which is capable of performing tasks or operations when executed by the computing device.

Next, the process 700 monitors performance of the software application, by the at least one processor, the performance comprising at least execution data and timing data associated with the software application (step 704). One suitable methodology for monitoring performance of the software application is described below with reference to FIG. 8. Here, the process 700 obtains data associated with execution of the software application and performance of operations of the software application, which may indicate whether software application tasks are successful and how long it takes for software application tasks to execute and/or reach completion.

The process 700 then presents visual feedback of the performance, via a display element of the computing device, the visual feedback comprising a first set of graphical elements indicating the timing data and successful execution of the software application (step 706). One suitable methodology for presenting visual feedback of the performance is described below with reference to FIG. 9. The visual feedback provides a graphical representation of whether the software application is performing, and how the software application is performing.

Figure 8:
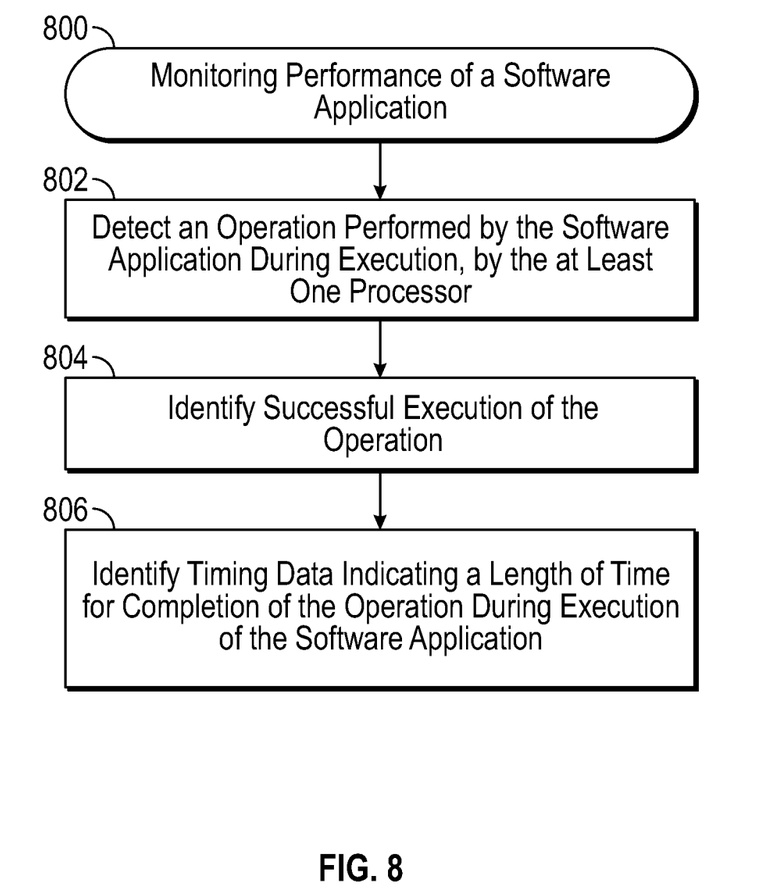
FIG. 8 is a flow chart that illustrates an embodiment of a process for monitoring performance of a software application.

FIG. 8 is a flow chart that illustrates an embodiment of a process 800 for monitoring performance of a software application. It should be appreciated that the process 800 described in FIG. 8 represents one embodiment of step 704 described above in the discussion of FIG. 7, including additional detail. The process 800 first detects an operation performed by the software application during execution, by the at least one processor (step 802). The operation may be any task or function executed and performed by the software application. In some embodiments, the operation detected by the process 800 is a network call executed by a communication hardware element of the computing device executing the software application, when the software application is communicating with a remote server (e.g., for a website or Internet resource).

The process 800 then identifies successful execution of the operation (step 804). Additionally, in some embodiments, the process 800 identifies completion of the operation, and whether the operation completed with the occurrence of one or more failures and/or completed successfully.

The process 800 identifies timing data indicating a length of time for completion of the operation during execution of the software application (step 806). In embodiments where the operation is a network call, the process 800 detects the network call executed by the software application, by a communication hardware element of the computing device, wherein the operation comprises the network call, and identifies the length of time for the computing device to receive a response to the network call, wherein the timing data indicates the length of time, and wherein the first set of graphical elements provides a visual representation of the length of time.

In some embodiments, the process 800 monitors performance of the software application by detecting the first operation (referenced previously) and a second operation performed by the software application during execution, by the at least one processor, and identifies second timing data indicating a length of time for completion of the second operation during execution of the software application. Here, separate timing data for each of the first operation and the second operation are identified by the process 800, and the process 800 presents a first set of graphical elements depicting the first set of timing data and a second set of graphical elements depicting the second timing data using distinguishing visual characteristics, by the display element. In this example, the process 800 presents the first set of graphical elements and the second set of graphical elements onscreen with the concurrent presentation of the software application, and wherein the visual feedback comprises the first set of graphical elements and the second set of graphical elements.

In some embodiments, the first and second operations may be selected by a user, and then detected by the process 800. Here, the process 800 first receives a user input selection of the first operation and/or the second operation, via a user interface of the computing device. The process 800 then receives, via the user interface, user input selections to customize the first set of graphical elements or the second set of graphical elements associated with performance of the first or second operation during execution of the software application, to generate customized graphical elements, wherein presenting the second set of graphical elements comprises presenting the customized graphical elements. Customized graphical elements may include user determined and customized details presented as part of the labels associated with presented graphical elements. The graphical elements are customizable, by a user (e.g., a software developer) at software application development time. Customizable characteristics of the graphical elements may include, without limitation, color, transparency level, graphical element size, label color, label transparency level, label font, and label text.

As described herein, the process 800 monitors performance of the software application by identifying the performance metrics, including whether the software application executed and/or completed successfully (step 804) and the timing data (step 806). Performance metrics may include any characteristic of the software application for which a user (e.g., a software developer) can insert a "start" marker and an "end" marker, which indicate the beginning of the execution of the operation and the completion of the operation, respectively.

Figure 9:
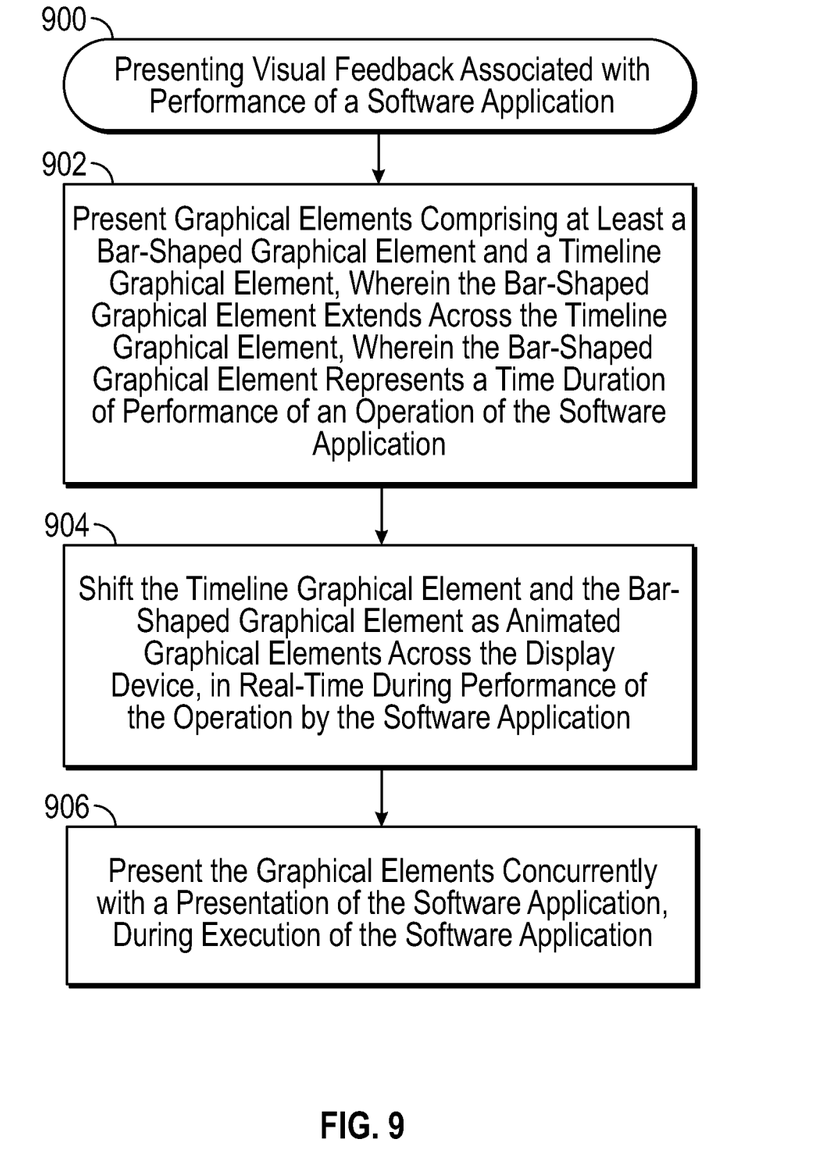
FIG. 9 is a flow chart that illustrates an embodiment of a process for presenting visual feedback associated with performance of a software application.

FIG. 9 is a flow chart that illustrates an embodiment of a process 900 for presenting visual feedback associated with performance of a software application. It should be appreciated that the process 900 described in FIG. 9 represents one embodiment of step 706 described above in the discussion of FIG. 7, including additional detail.

The process 900 presents visual feedback in the form of graphical elements comprising at least a bar-shaped graphical element and a timeline graphical element, wherein the bar-shaped graphical element extends across the timeline graphical element, and wherein the bar-shaped graphical element represents a time duration of performance of an operation of the software application (step 902). Here, the process 900 presents the bar-shaped element to extend from a starting point of performance of the operation to an endpoint of performance of the operation, wherein the timeline comprises the starting point and the endpoint, wherein the first set of graphical elements comprises the timeline and the bar-shaped graphical element. The process 900 then shifts the timeline graphical element and the bar-shaped graphical element as animated graphical elements across the display device, in real-time, during performance of the operation by the software application (step 904).

In some embodiments, the process 900 presents the bar-shaped graphical elements concurrently with a presentation of the software application, during execution of the software application (step 906). Here, the bar-shaped graphical elements may be positioned as an overlay to a user interface of the executed software application. In this particular example, the timeline graphical element is not included. However, in some embodiments, the process 900 presents the bar-shaped graphical elements positioned as an overlay to a timeline graphical element.

When the operation associated with the bar-shaped graphical elements is a network call, the process 900 identifies data associated with the network call, by the at least one processor, the data associated with the network call comprising at least the timing data for the network call, a Uniform Resource Locator (URL) for the network call, and identification of transmitted and received data during the network call, and presents, by the display element, the first set of graphical elements depicting the timing data, the URL, and the identification.

The various tasks performed in connection with processes 700-900 may be performed by software, hardware, firmware, or any combination thereof. For illustrative purposes, the preceding description of processes 700-900 may refer to elements mentioned above in connection with FIGS. 7-9. In practice, portions of processes 700-900 may be performed by different elements of the described system. It should be appreciated that processes 700-900 may include any number of additional or alternative tasks, the tasks shown in FIGS. 7-9 need not be performed in the illustrated order, and processes 900-1100 may be incorporated into a more comprehensive procedure or process having additional functionality not described in detail herein. Moreover, one or more of the tasks shown in FIGS. 7-9 could be omitted from an embodiment of one or more of the processes 700-900 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for presenting a visual implementation of data by a computing device comprising at least one processor and a system memory element, the method comprising:
    executing a software application, by the at least one processor of the computing device;
    monitoring, by the at least one processor, performance of the software application during execution;
    detecting an orientation of the computing device; and
    presenting visual feedback of the performance of the software application, via a display element of the computing device, the visual feedback comprising graphical elements indicating the performance;
    wherein, when the detecting detects a first orientation of the computing device, the presenting step presents the graphical elements as an overlay that is superimposed over presentation of the software application that is concurrently executed and presented; and
    wherein, when the detecting detects a second orientation of the computing device, the presenting step replaces the presentation of the software application with a different graphic, and the presenting step presents the graphical elements as an overlay that is superimposed over the different graphic.

2. The method of claim 1, wherein the different graphic comprises a timeline graphic.

3. The method of claim 1, wherein the first orientation is a portrait orientation of the computing device, and the second orientation is a landscape orientation of the computing device.

4. The method of claim 1, wherein:
the monitoring step identifies successful execution of an operation performed by the software application, and identifies timing data indicating a length of time for completion of the operation during execution of the software application; and
the graphical elements indicate the successful execution and the timing data.

5. The method of claim 1, further comprising:
detecting a network call executed by the software application, by a communication hardware element of the computing device; and
identifying the length of time for the computing device to receive a response to the network call, wherein the graphical elements provide a visual representation of the length of time.

6. The method of claim 5, wherein presenting the graphical elements further comprises:
identifying data associated with the network call, by the at least one processor, the data associated with the network call comprising at least timing data for the network call, a Uniform Resource Locator (URL) for the network call, and identification of transmitted and received data during the network call; and
presenting, by the display element, the graphical elements depicting the timing data, the URL, and the identification.

7. The method of claim 1, further comprising:
presenting a bar-shaped graphical element extending across a timeline, the bar-shaped element representing a time duration associated with performance of an operation of the software application;
wherein the bar-shaped element extends from a starting point of execution of the operation to an endpoint of performance of the operation;
wherein the timeline comprises the starting point and the endpoint;
wherein the graphical elements comprises the timeline and the bar-shaped graphical element.

8. The method of claim 7, further comprising:
shifting the timeline and bar-shaped element as animated graphical elements across the display element of the computing device, in real-time and during performance of the operation by the software application;
wherein presenting the graphical elements comprises presenting the animated graphical elements.

9. A computing device, comprising:
a system memory element;
a display element; and
at least one processor communicatively coupled to the system memory element and the display element, the at least one processor for:
executing a software application;
monitoring performance of the software application during the executing;
detecting an orientation of the display element; and
presenting visual feedback of the performance of the software application, via the display element, the visual feedback comprising graphical elements indicating the performance, and the graphical elements being presented onscreen with a concurrent presentation of the software application;
wherein, when the detected orientation is a first orientation, the at least one processor presents the graphical elements as an overlay that is superimposed over the presentation of the software application that is concurrently executed and presented; and
wherein, when the detected orientation is a second orientation, the at least one processor stops the presentation of the software application, and the presenting step replaces the presentation of the software application with the graphical elements.

10. The computing device of claim 9, wherein the first orientation is a portrait orientation of the display element, and the second orientation is a landscape orientation of the display element.

11. The computing device of claim 10, wherein, when the detecting step detects a change in orientation from the portrait orientation to the landscape orientation, the at least one processor replaces the presentation of the software application with a different graphic, and the presenting step presents the graphical elements as an overlay that is superimposed over the different graphic.

12. The computing device of claim 11, wherein the different graphic comprises a timeline graphic.

13. The computing device of claim 9, wherein:
the at least one processor monitors performance of the software application by identifying successful execution of an operation performed by the software application, and by identifying timing data indicating a length of time for completion of the operation during execution of the software application; and
the graphical elements indicate the successful execution and the timing data.

14. The computing device of claim 9, further comprising a communication hardware element communicatively coupled to the at least one processor, the communication hardware element configured to execute a network call;
wherein the at least one processor identifies a length of time for the computing device to receive a response to the network call, wherein the graphical elements provide a visual representation of the length of time.

15. The computing device of claim 14, wherein the at least one processor presents the graphical elements by:
identifying data associated with the network call, the data associated with the network call comprising at least the timing data for the network call, a Uniform Resource Locator (URL) for the network call, and identification of transmitted and received data during the network call; and
presenting, via the display element, the graphical elements depicting the timing data, the URL, and the identification.

16. The computing device of claim 9, wherein the at least one processor presents the visual feedback by:
presenting a bar-shaped graphical element extending across a timeline from a starting point of execution of an operation of the software application to an endpoint of performance of the operation, wherein the bar-shaped element indicates the successful execution of the operation and represents a time duration associated with performance of the operation, and wherein the graphical elements comprises the timeline and the bar-shaped graphical element.

17. The computing device of claim 16, wherein the at least one processor presents the visual feedback, by:

shifting the timeline and bar-shaped element as animated graphical elements across the display element of the computing device, in real-time and during performance of the operation by the software application;

wherein presenting the graphical elements comprises presenting the animated graphical elements.

18. A non-transitory, computer-readable medium containing program instructions configurable to cause a processor of a computing device to perform a method comprising the steps of:

executing a software application;

monitoring performance of the software application during execution;

detecting a change in orientation of the computing device; and presenting visual feedback of the performance of the software application, via a display element of the computing device, the visual feedback comprising graphical elements indicating the performance, and the graphical elements presented onscreen with a concurrent presentation of the software application;

wherein, when the orientation comprises a first orientation, the presenting step presents the graphical elements as an overlay that is superimposed over the presentation of the software application that is concurrently executed and presented; and wherein, when the orientation comprises a second orientation, the presenting step replaces the presentation of the software application with a different graphic, and the presenting step presents the graphical elements as an overlay that is superimposed over the different graphic.

19. The computer-readable medium of claim 18, wherein the different graphic comprises a timeline graphic.

20. The computer-readable medium of claim 19, wherein the first orientation is a portrait orientation of the computing device, and the second orientation is a landscape orientation of the computing device.

* * * * *